June 25, 1963  R. K. LEARMONT  3,094,940
APPARATUS FOR LOADING AND STORING ARTICLES
Filed March 7, 1960  2 Sheets-Sheet 1
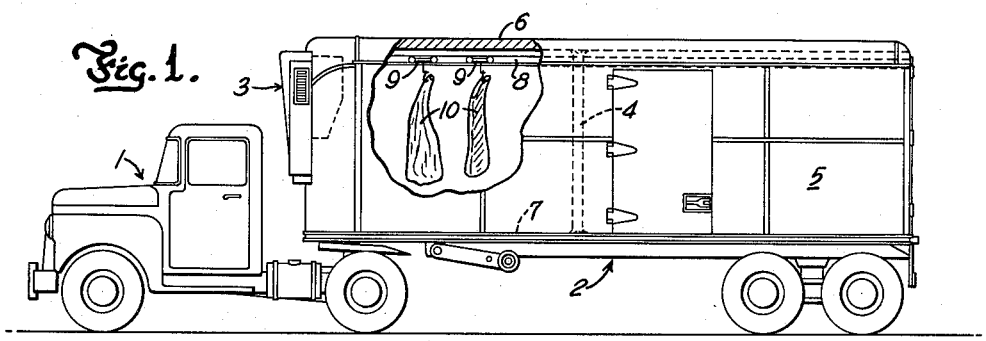
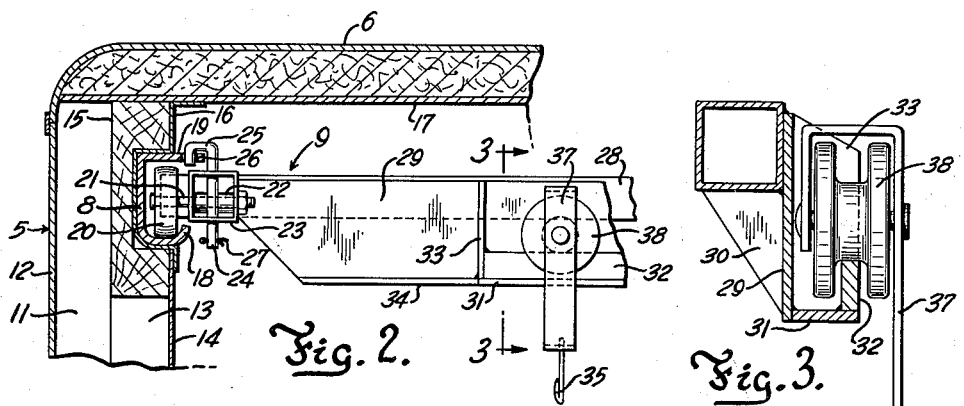
INVENTOR.
Robert K. Learmont
BY
Attorneys

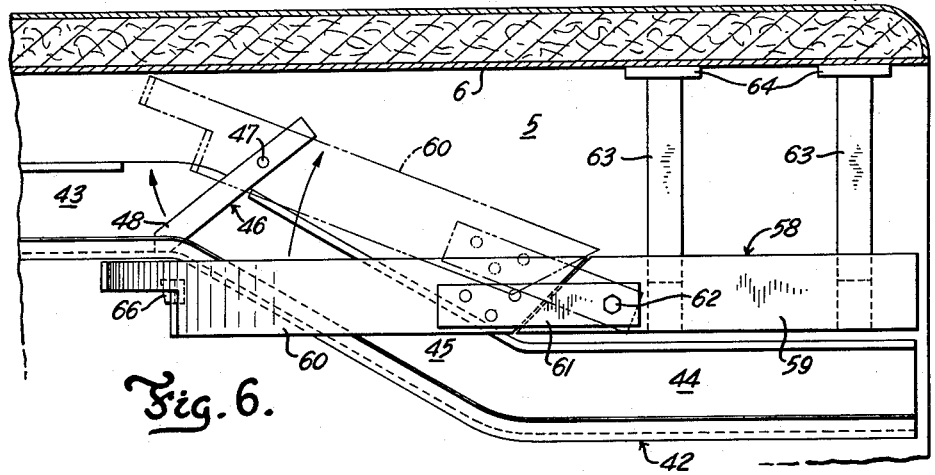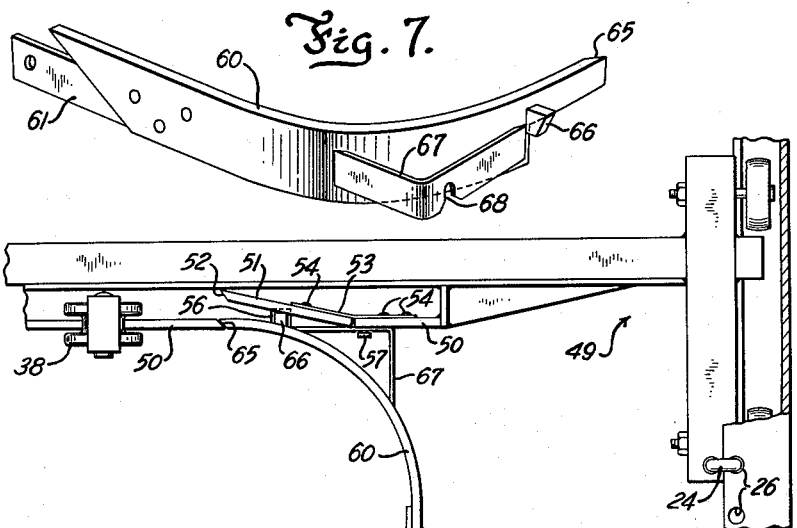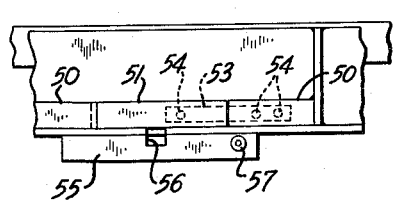

United States Patent Office 3,094,940
Patented June 25, 1963

3,094,940
APPARATUS FOR LOADING AND
STORING ARTICLES
Robert K. Learmont, Hales Corners, Wis., assignor of one-half to C. J. Williams, River Hills, Wis.
Filed Mar. 7, 1960, Ser. No. 13,135
8 Claims. (Cl. 104—98)

This invention relates to an apparatus for loading articles in a storage structure and more particularly to an apparatus for loading and storing meat in a vehicle such as a trailer.

In the trucking industry, carcass quarters or other large sections of meat are loaded into a trailer by hanging the meat on hooks attached to rollers and feeding the rollers onto guide tracks mounted on the ceiling of the trailer. In some installations, a series of longitudinal tracks are employed. In other installations, a single longitudinal track is used in combination with a series of transverse tracks and the meat is fed onto the longitudinal track and switched to the transverse tracks. Due to the weight of the meat to be hung from the tracks, the conventional track installation is quite heavy and weighs generally in the range of 1500 to 2000 pounds. This track weight is dead load and thus, takes away from the pay load of the trailer.

In the hauling of food products, it is often desirable to divide the trailer into one or more compartments when hauling various foods in a single load. In a mixed load, such as this, insulated panels are employed to divide the trailer into a series of compartments with each compartment being maintained at the desired temperature. With a system such as this, only a small portion of the total load of the trailer may be meat, and yet the entire track installation is present which reduces the overall pay load of the trailer.

The present invention is directed to an apparatus for loading and storing meat in a trailer in which the meat is supported by a series of removable carriages or dollies which are individually installed in the trailer as needed. More specifically, the side walls of the trailer are provided with guide tracks which run substantially the length of the trailer and the carriages ride on the track and can be locked at any position along the length of the trailer. Each carriage includes a meat rail which extends transversely of the trailer. The carcass sections of meat are suspended from roller units which are fed onto the rail either by use of an auxiliary feed rail located on the loading platform, or by using a permanent feed rail section attached to the ceiling at the rear of the trailer. After the desired number of roller units supporting the meat have been fed onto the rail, the carriage is then pushed forwardly in the trailer to the desired location and locked against movement. A second carriage is then engaged with the guide track and the loading procedure is repeated.

The present invention provides a simple and inexpensive installation for loading and storing meat or other products in a trailer. The only permanent portion of the installation is the guide tracks which are secured to the side walls of the trailer. As the guide tracks are formed of relatively thin gauge material, the dead load of the trailer, when not hauling meat, is maintained at a minimum. In addition, as the guide tracks are recessed in the side walls, the tracks will not interfere with loading of other material in the trailer.

As the meat is suspended and supported by individual carriages which are movable on the guide track, only the carriages required for a particular load need be employed, and this will minimize the weight of the supporting equipment and thereby increase the pay load of the trailer.

In the use of a mixed load in which various compartments are employed, it is possible to move the carriages supporting the meat to any position throughout the length of the trailer and lock the carriages at this location.

The drawings illustrate the best mode presently contemplated of carrying out the invention.

In the drawings:

FIGURE 1 is a side elevation with parts broken away in section of a tractor and trailer with the trailer incorporating the meat loading apparatus of the invention;

FIG. 2 is a fragmentary transverse section taken through the trailer and showing the attachment of the carriages to the guide track;

FIG. 3 is a section taken along line 3—3 of FIG. 2 and showing the attachment of the meat carrying rollers on the guide rail;

FIG. 4 is a fragmentary horizontal section showing the rollers located within the guide tracks;

FIG. 5 is a fragmentary vertical section showing the stop lever at the rear end of the guide track;

FIG. 6 is a fragmentary vertical section of a modified form of the invention and showing the use of a permanent feeder rail;

FIG. 7 is a perspective view of the feeder rail;

FIG. 8 is a top plan view of the embodiment shown in FIG. 6 and showing the feeder rail attached to the meat carrying rail; and FIG. 9 is a fragmentary end view of the carriage structure of the embodiment of FIG. 6.

The drawings illustrate a tractor 1 which is connected to and hauls a trailer 2. A refrigerating unit 3 is located in the forward wall of the trailer and serves to cool or refrigerate the same. If it is desired to haul mixed loads of food products, such as meat, ice cream, produce and the like, one or more panels 4 may be disposed transversely within the trailer 2 to divide the trailer into a series of separate compartments.

The trailer 2 comprises a pair of side walls 5, a top wall or ceiling 6 and a bottom wall 7. According to the invention, a pair of guide tracks 8 are secured to the side walls 5 adjacent the top wall 6 and a plurality of individual carriages 9 are adapted to ride on the guide tracks and carry or support the carcass sections of meat 10.

As best shown in FIG. 2, the side wall 5 of the trailer includes a series of spaced vertical studs 11 and a facing material 12 secured to the outer surface of the studs. In addition, a series of spaced vertical studs 13 are located inwardly of the studs 11 and a facing 14 is secured to the studs 13 and provides a relatively smooth interior surface for the trailer.

A horizontal strip 15 is supported on the upper ends of the studs 13, and the guide track 8 is secured within a recess in the strip 15.

To prevent moisture condensation from seeping downwardly behind the guide track 8, flashing 16 is secured to the facing 17 on the ceiling 6 and extends downwardly within the recess in the strip 15 and overlaps the facing 14 on the side wall 5. With the use of flashing 16, any moisture or condensation will be diverted inwardly over the facing 14 rather than accumulating behind the guide track 8.

Each guide track 8 comprises an upwardly extending lower lip 18 and a laterally extending upper flange 19. Both the lip 18 and the flange 19 extend laterally beyond the side wall 5 of the trailer.

Each end of the carriage 9 is provided with a pair of rollers 20 which ride on the guide track 8. As best shown in FIG. 2, the rollers 20 are each secured to a shaft 21 which is journaled within a sleeve bearing 22 secured within aligned openings in the side walls of a longitudinal support member 23. The inner end of each shaft 21 is threadedly engaged by a suitable nut.

To lock the carriage at any given position along the length of the trailer, a locking pin 24 is disposed within aligned vertical openings in the hollow support member 23. The upper end of the locking pin 24 is provided with a hook 25 which is adapted to be received within one of a series of holes 26 provided in the outer portion of the flange 19 of the guide track. To prevent upward removal of the locking pin 24 from the holes 26, a cotter pin 27 is secured within a hole in the lower end of the pin.

A cross tube 28 having a generally rectangular cross section extends between the support members 23 and is welded within openings in the support members. The ends of the cross tube 28 project laterally beyond the support members to a location above the respective guide track 8 and above the studs 13. In the event that one of the rollers 20 should fail, the corresponding end of the cross tube 28 will fall downwardly onto the guide track so that the entire carriage will be supported on the track and the meat hanging thereon would not contact the bottom of the trailer.

As best shown in FIG. 3, a plate 29 is secured to the rear face of the cross tube 28 and a series of webs 30 provide reinforcement for the cross tube and the plate 29. A horizontal plate 31 extends rearwardly from the lower end of plate 29 and a rail 32 is secured to the plate 31 and extends upwardly therefrom in spaced parallel relation to the plate 29. A vertical stop plate 33 extends outwardly from the plate 29 adjacent each end of the carriage and a horizontal web 34 provides reinforcement for the stop plate.

The carcass sections of meat 10 are suspended on hooks 35 and the upper end of each hook is engaged within an opening in the bottom flange 36 of a roller bracket 37. The upper end of the bracket 37 has a reverse bend and a roller 38 is journaled within the upper end of the bracket. The roller is provided with a central recess which engages the rail 32 and the edges of the roller, which are disposed on either side of the rail, prevent lateral displacement of the roller from the rail.

As best shown in FIG. 4, the longitudinal center line of the rail 32 lies midway between the axes of the rollers 20 at each end of the carriage so that the weight of the meat suspended from the rail will be distributed equally to both rollers of each pair.

In loading the meat 10 on the carriages 9, a carriage is initially mounted on the guide track 8 by inserting the rollers 20 into the rear open end of the track. The carriage is then locked in place at the rear end of the trailer by engagement of the locking pin 24 with one of a series of holes 26 in the upper flange 19 of the guide track.

With the carriage properly locked in position, the meat which is suspended from the rollers 38, is moved along the loading platform along a suitable conveyor rail, not shown, and is switched from the conveyor rail over a curved feed rail section onto the meat support rail 32. After a series of rollers 38 supporting meat sections 10 have been fed onto the carriage, the locking pins 24 are removed from the holes 26 and the carriage is moved forwardly along the track to the desired location in the trailer at which location it is again locked by inserting the upper end of the locking pins 24 within the holes 26. A second carriage is then inserted on the guide track and is loaded in a similar manner.

On unloading, the carriages are successively moved to the rear of the trailer and locked in position and the meat rollers 38 are then moved over the rail 32 onto the curved feeder rail, not shown, onto the loading platform.

To prevent the carriage 9 from moving freely from the outer end of the track 8, a stop lever 39 is employed at the rear or outer end of each track. The stop lever 39 is pivotally connected to the side wall 5 of the trailer by a pin 40. The lower end of the lever is provided with an enlarged head, as indicated by 41, which counterweights the lever to the downward position. A portion of the upper flange 19 on the guide track 8 is removed at the location of the stop lever 39 to permit the lever to be pivoted upwardly. When the carriages 9 are inserted on the guide track, the rollers 20 will engage the levers and pivot the same upwardly around the pin 40. However, as the carriages are moved rearwardly during unloading, the rollers will engage the head 41 which will prevent the carriages from rolling freely out of the guide track. When the carriage is to be removed, the levers are pivoted upwardly by hand to a position where the rollers 20 can pass beneath the stop lever to thereby remove the carriage from the track.

FIGS. 6 through 9 show a modified form of the invention in which a feeder rail is permanently installed to the ceiling of the trailer and serves to feed the meat sections onto the individual carriages. As best shown in FIG. 6, the guide track 42 comprises a generally horizontal upper section 43 and a generally horizontal lower section 44, located at the rear of the trailer 2, which are connected by a diagonal section 45. The structure of the track 42 is substantially identical to track 8 shown in the first embodiment.

In this embodiment, a stop lever 46, similar in structure to stop lever 39, is pivotally attached by pin 47 to the side wall 5 of the trailer. The heavy head 48 of the stop lever 46 serves as a counter-weight to pivot the lever to the downward position. The head 48 is located at the rear extremity of the upper straight portion 43 of the track and prevents the carriages from moving down the sloped or diagonal portion 45 of the track during the unloading operation.

A plurality of carriages or dollies 49, similar to the carriages 9 of the first embodiment, are adapted to be engaged with the guide track 42 and each carriage 49 is provided with a transverse rail 50 which corresponds to the rail 32. In this embodiment, however, the rail 50 is provided with a pivotable switch 51 and the switch is provided with an angular edge 52 which complements the angular edge of the rail 50.

The switch 51 is biased to the closed position by a strip spring 53 which is secured to the back surface of the rail 50 and switch 51 by screws 54.

In addition, a plate 55 is secured edgewise to the lower surface of the rail 50 and the rear facing surface of the plate 55 is substantially flush with the corresponding surface of rail 50. The plate 55 is provided with a notch 56 which is located beneath the switch 51, and a stud 57 extends rearwardly from the plate 55 at a location laterally outward from the notch 56.

A feeder rail 58 is adapted to be permanently connected to the ceiling of the trailer and serves to convey the feed rollers 38 from a conveyor rail located at the loading platform onto the rail 50 of each carriage. As best shown in FIGS. 7 and 8, the feeder rail 58 is provided with a 90° curve.

The rail 58 comprises a fixed rear section 59 and a forward section 60 which is pivotally connected to the rear section 59 by a tie plate 61. The sections 59 and 60 are provided with complementary diagonally extending edges and the tie plate 61 is pivotally connected to the rear section 59 by means of pin 62. With this construction, the forward section 60 can be pivoted upwardly about the pin 62 and the diagonal edges limit the downward movement of the forward section with respect to the rear section 59. In the lower position, the forward section 60 would prevent the carriages 9 from being moved up the diagonal portion 45 of the guide track and thus when the carriages are installed, the forward section 60 of the feeder rail is pivoted upwardly to a position where it will not interfere with the movement of the carriages 49. A hook, not shown, may be secured to the ceiling of the trailer and employed to hold or lock the forward section 60 in the upper position.

The rear section 59 of the feeder rail is secured to the trailer by a pair of vertical support members 63 which are connected to plates 64 secured to the ceiling 6 of the trailer.

The inner vertical edge 65 of the feeder rail 58 is beveled and is adapted to complement the beveled edge of the rail 50 when the feeder rail is secured to the carriage during the loading and unloading operations.

In order to open the switch 51 and permit alignment of the beveled edge 65 of the feeder rail with the rail 50, the feeder rail is provided with a projection 66 which extends outwardly and is adapted to engage and open the switch when the forward section 60 of the feeder rail is pivoted downwardly toward the rail 50. The projection 66 is received within notch 56 of plate 55, and the outer end of the projection holds switch 51 open so that the meat carrying rollers 38 can be moved freely from feeder rail 58 into rail 50.

To properly align the feeder rail 58 with respect to the carriage 49, a generally square bracket 67 extends outwardly from the feeder rail and is adapted to engage the rear surface of the rail 50. To maintain alignment of the members, the bracket 67 is provided with a notch 68 which receives the head of the stud 57 and thereby insures that the members will be properly aligned during the loading and unloading of the meat sections.

In operation of this modified form of the invention, the carriage 49 is inserted within the lower portion 44 of the track and the forward section 60 of the feeder rail 58 is then pivoted upwardly to permit the carriage to be moved up the diagonal section 45 of the track onto the upper section 43. With the carriage properly aligned, it is locked in position by use of the locking pin 24.

The forward section of the feeder rail is then pivoted downwardly and the projection 66 engages and opens the switch 51 so that the beveled edge 65 of the feeder rail will engage the beveled edge of the rail 50. The projection 66 serves to maintain the switch 51 out of contact with the feeder rail so that the meat rollers 38 can move from the feeder rail onto the rail 50.

After the desired number of meat rollers 38 have been fed onto the rail 50, the forward section 60 of the feeder rail is raised, the carriage is unlocked and moved forwardly to the desired location. A second carriage is then fed onto the upper section 43 of the guide track in a manner described above and this carriage is then loaded as previously related.

The present invention provides a simple and economical apparatus for loading and storing food products, such as meat or other articles, in a trailer. The only permanent installation required is the guide track which is recessed within the side walls of the trailer. The carriages, which support the meat, are removed from the trailer if they are not being used so that no dead weight is present in the trailer and this correspondingly increases the pay load.

The apparatus is particularly adaptable to a system in which mixed loads of various food products are being hauled in a single trailer in that only the desired number of carriages are utilized and this substantially reduces the weight of the meat supporting equipment.

Various modes of carrying out the invention are contemplated as being within the scope of the following claims particularly pointing out and distinctly claiming the subject matter which is regarded as the invention.

I claim:

1. In a trailer, a body defining a storage compartment and including a pair of side walls, a top wall and a bottom wall, a track secured to each side wall adjacent the top wall and disposed in a substantially horizontal plane, an upper flange disposed above each track extending inwardly beyond the inner surface of the respective side wall, said flange being provided with a series of openings disposed in spaced relation along the length of the side wall, a carriage disposed transversely of said body with each end of the carriage having a guide member on each end disposed to ride on the corresponding track, a rail secured to the carriage and extending transversely of said body, a locking member connected to each end of the carriage and disposed to be received within one of said openings in said flange to thereby lock the carriage with respect to the track, and roller means disposed to engage the rail for supporting a carcass section of meat, said carcass section being fed onto said rail and said carriage subsequently being moved lengthwise within the trailer to the desired location for hauling.

2. In a trailer, a body defining a storage compartment and including a pair of side walls, a top wall and a bottom wall, a track secured to each side wall adjacent the top wall and having an inner generally horizontal section and having an outer generally angular section extending downwardly and outwardly from said horizontal section toward the rear of the trailer, a carriage extending transversely of said body with each end of the carriage having a pair of rollers disposed to ride on the corresponding track, a rail secured to the carriage and extending transversely of the body, roller means engagable with the rail for supporting an article, a feeder rail permanently connected to said body and having an outer generally straight portion located at the rear of said body and having an inner generally curved portion disposed to connect said straight portion and said rail of the carriage to be loaded, and means for pivotally connecting said outer portion to said inner portion to permit the inner portion to be pivoted to a position whereby the carriage may be moved up said angular portion of the track to said horizontal section without interference from said feeder rail.

3. In a trailer, a body defining a storage compartment and including a pair of side walls, a top wall and a bottom wall, a track secured to each side wall adjacent the top wall and disposed in a substantially horizontal plane, a carriage extending transversely of said body with each end of the carriage having a guide member disposed to ride on the corresponding track, a rail secured to the carriage and extending transversely of the body, said rail including a switch portion movable from an open position to a closed position, means engagable with the rail for supporting an article, and a feeder rail permanently connected to said body and having an outer generally straight portion located at the rear of said body and having an inner generally curved portion, the inner end of said curved portion disposed to engage and complement said first named rail when the switch portion is open to permit said roller means supporting said article to be moved freely from the outer straight portion of said feeder rail onto said first named rail.

4. The structure of claim 3, and including means connected to said feeder rail for engaging and opening said switch portion on said first named rail.

5. The structure of claim 3, and including means connected to said feeder rail and engagable with said first named rail for aligning said straight portion of said feeder rail at an angle of approximately 90° to said first named rail.

6. In a trailer, a body defining a storage compartment and including a pair of side walls, a top wall and a bottom wall and having an open rear end, a longitudinal guide member secured to each side wall with the guide members being disposed in a substantially horizontal plane and extending from said open rear end substantially continuously throughout the length of the compartment, a carriage movably supported on the guide members and including a cross member extending transversely of the compartment, means connected to each end of the cross member for engaging the respective longitudinal guide member and riding thereon, a support rail adapted to support an article to be transported and connected to the carriage and extending transversely of the compartment and disposed at a lower height than the longitudinal guide members, and a feed rail member secured to the body of the trailer and including a straight portion extending from the rear open end of the trailer and including a curved portion connecting the straight portion to said support rail, one of said members having an inclined portion adjacent the open rear end to enable the carriages to be engaged with the longitudinal guide members at the open rear end of the compartment and to be moved inwardly of the compartment past the feeder rail.

7. In a trailer, a body defining a storage compartment and including a pair of side walls, a top wall and a bottom wall and having an open rear end, a longitudinal guide member secured to each side wall with the guide members being disposed in a substantially horizontal plane and extending substantially continuously from said rear open end throughout the length of said compartment, at least one carriage movably supported on the guide members and including a cross member extending transversely of the compartment with the ends of the cross member extending above the respective longitudinal guide members, means connected to each end of the cross member and disposed longitudinally of the compartment on each side of said cross member for engaging the respective guide member and riding thereon whereby the carriage can be moved longitudinally throughout the length of the compartment, a rail secured to the carriage and extending substantially transversely of the compartment, said rail adapted to receive and support a plurality of articles with said articles being loaded on the rail while the carriage is located adjacent the open rear end of the compartment and the carriage being subsequently moved longitudinally through the compartment to the desired location for transporting, and feeder rail means permanently secured to the body and having a generally straight portion disposed longitudinally of the compartment and extending outwardly to said open rear end and having an inner curved portion disposed to connect said straight portion to said rail.

8. In a trailer, a body defining a storage compartment and including a pair of side walls, a top wall and a bottom wall and having an open rear end, a longitudinal guide member secured to each side wall with the guide members being disposed in a substantially horizontal plane and extending from adjacent said rear open end the length of said compartment, at least one carriage movably supported on the guide members and extending transversely of the compartment, means connected to each end of the carriage for engaging the respective guide member and riding thereon whereby the carriage can be moved longitudinally throughout the length of the compartment, a rail secured to the carriage and extending substantially transversely of the compartment, said rail adapted to receive and support a plurality of articles with said articles being loaded on the rail while the carriage is located adjacent the open rear end of the compartment and the carriage being subsequently moved longitudinally through the compartment to the desired location for transporting, and feeder rail means secured to the body and having an outer portion disposed longitudinally of the compartment and extending outwardly to said open rear end and having an inner curved portion disposed to connect said outer portion to said rail.

References Cited in the file of this patent

UNITED STATES PATENTS

| | | |
|---|---|---|
| 445,060 | Jarvis | Jan. 20, 1891 |
| 1,117,545 | Beausejour | Nov. 17, 1914 |
| 1,341,996 | Plucienski | June 1, 1920 |
| 1,727,547 | Knoll | Sept. 10, 1929 |
| 2,482,855 | Lloyd | Sept. 27, 1949 |
| 2,513,355 | Peckinpaugh | July 4, 1950 |
| 2,778,512 | Stroma | Jan. 22, 1957 |
| 2,819,683 | Le Fiell | Jan. 14, 1958 |